United States Patent [19]

Schmoock

[11] 4,253,340

[45] Mar. 3, 1981

[54] UNITARY ELECTROMAGNETIC FLOWMETER

[75] Inventor: Roy F. Schmoock, Yardley, Pa.

[73] Assignee: Fischer & Porter Co., Warminster, Pa.

[21] Appl. No.: 75,037

[22] Filed: Sep. 12, 1979

Related U.S. Application Data

[60] Continuation-in-part of Ser. No. 811,276, Jun. 29, 1977, Pat. No. 4,181,018, which is a division of Ser. No. 771,420, Feb. 23, 1977, Pat. No. 4,098,118.

[51] Int. Cl.³ .................................................. G01F 1/58
[52] U.S. Cl. .................................................. 73/861.12
[58] Field of Search .................................... 73/861.12

[56] References Cited

U.S. PATENT DOCUMENTS

| | | | |
|---|---|---|---|
| 3,490,282 | 1/1970 | Wada | 73/861.15 |
| 3,504,541 | 4/1970 | Birnstingl | 73/861.12 |
| 3,745,824 | 7/1973 | Mannherz et al. | 73/861.12 |
| 3,824,856 | 7/1974 | Yard | 73/861.12 |
| 3,981,190 | 9/1976 | Vidmantas | 73/861.12 |
| 4,065,965 | 1/1978 | Ackerman et al. | 73/861.12 |

FOREIGN PATENT DOCUMENTS 2040682 of 1972 Fed. Rep. of Germany ........ 73/861.12

*Primary Examiner*—Charles A. Ruehl
*Attorney, Agent, or Firm*—Michael Ebert

[57] ABSTRACT

A highly compact electromagnetic flowmeter unit interposable between the flanged ends of upstream and downstream line pipes for metering fluid passing through the line, the unit being subject to compression by these flanged ends to effect a fluid seal. The flowmeter is constituted by a non-magnetic metal spool of high strength whose inner surface is lined with insulating material to provide a flow conduit for the fluid to be metered, the spool also serving to withstand the compressive forces to which the unit is subjected as well as the fluid pressure. Surrounding the spool and concentric therewith is a cylindrical housing fabricated of ferromagnetic material, the housing being preferably formed by complementary half-pieces which are interconnected and include end plates which join the corresponding ends of the spool to define an inner chamber. Integral with the half-pieces are two magnet cores which extend at diametrically opposed positions along an axis normal to the longitudinal axis of the cylindrical housing, the cores being surrounded by coils to define electromagnets. Mounted on the spool at diametrically-opposed positions along a transverse axis at right angles to the core axis are two electrodes. The inner chamber is filled with a potting compound to encapsulate the electromagnets and the electrodes, the housing serving as a mold for this purpose.

12 Claims, 3 Drawing Figures

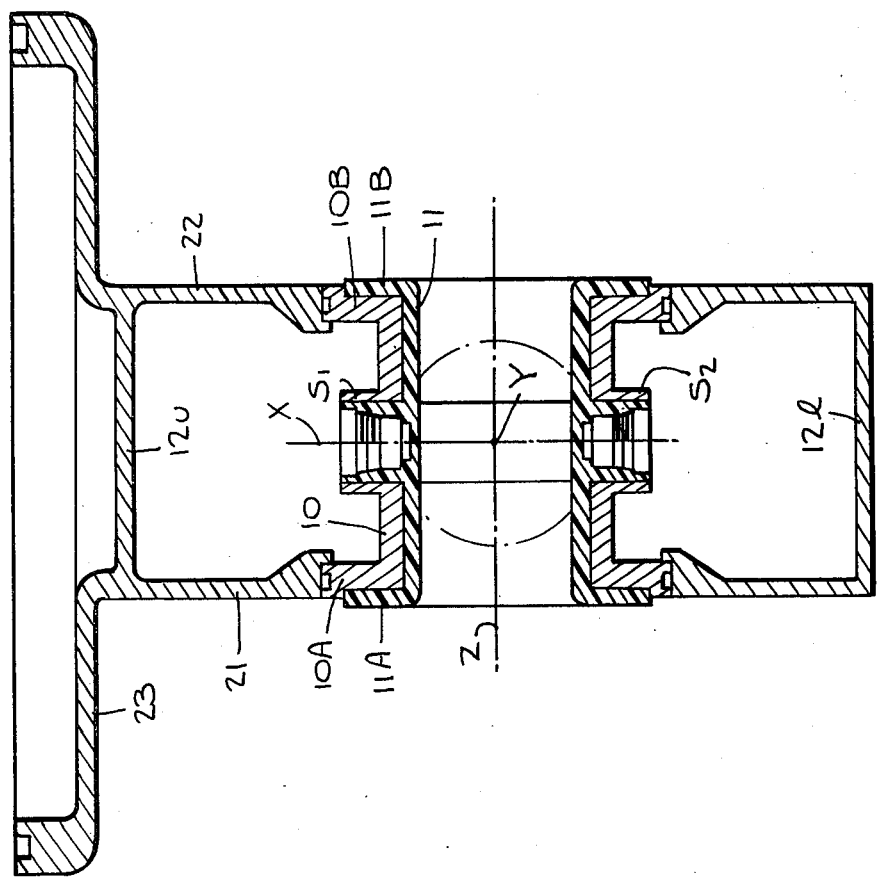
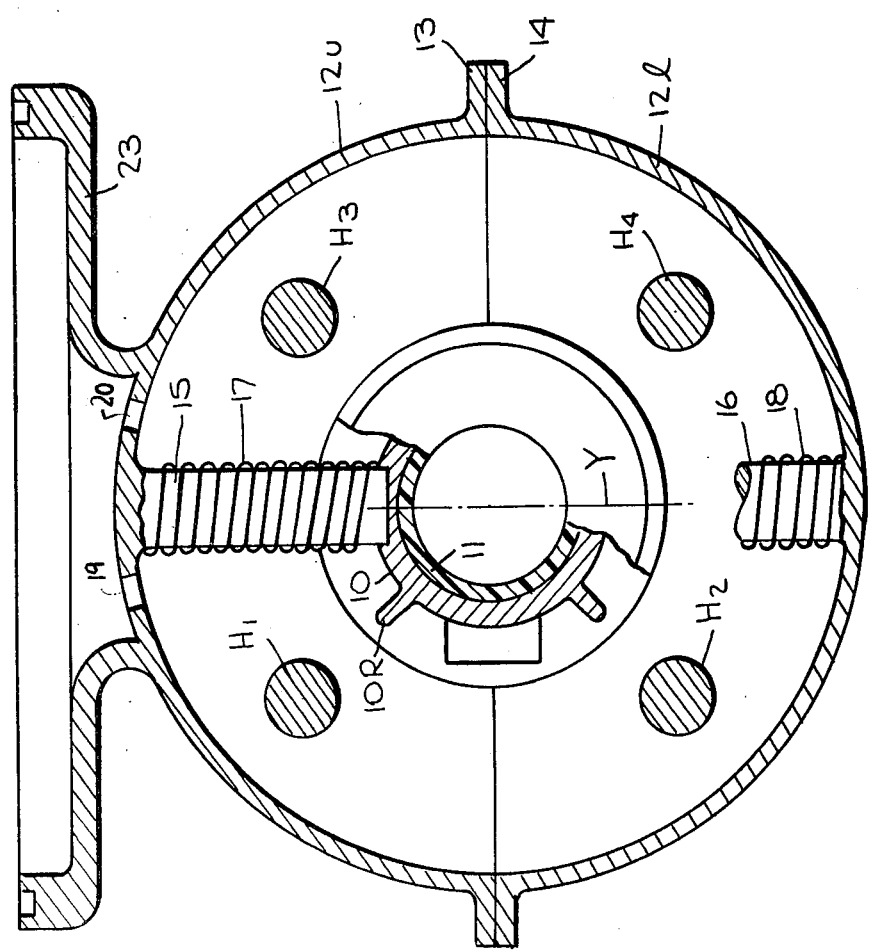

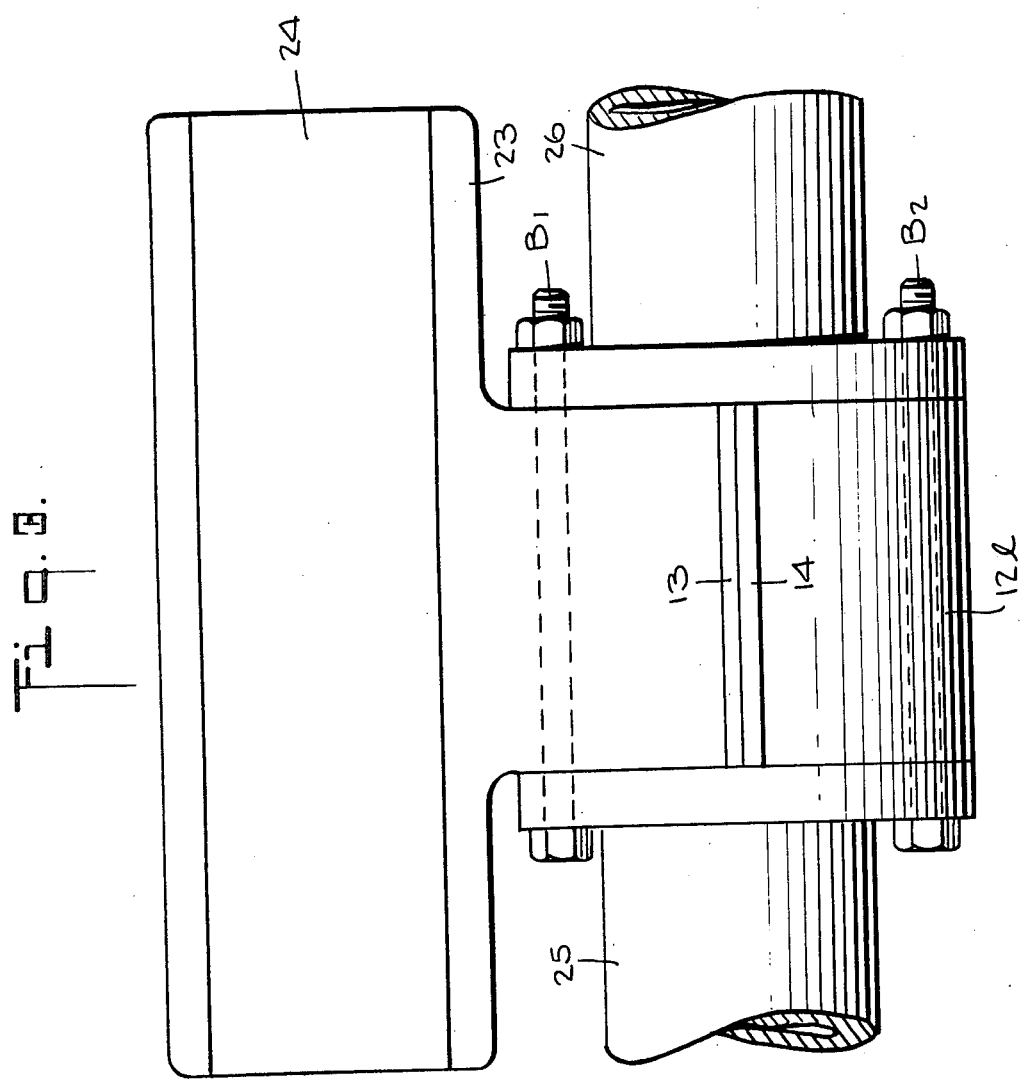

UNITARY ELECTROMAGNETIC FLOWMETER

RELATED CASES

This application is a continuation-in-part of a Schmoock application Ser. No. 811,276, filed June 29, 1977, now U.S. Pat. No. 4,181,018, which in turn is a division of a Schmoock application Ser. No. 711,420, filed Feb. 23, 1977, now U.S. Pat. No. 4,098,118, the entire disclosure of these Schmoock cases being incorporated herein by reference.

BACKGROUND OF INVENTION

This invention relates generally to electromagnetic flowmeters, and more particularly to a flangeless flowmeter whose componenets are integrated to form a highly compact, low-cost unit that may be readily installed in a flow line, the unit being compressible between the flanged ends of the upstream and downstream pipes and being capable of withstanding high compressive forces.

Magnetic flowmeters such as those disclosed in U.S. Pat Nos. 3,695,104; 3,824,856; 3,783,687 and 3,965,783, are especially adapted to measure the volumetric flow rates of fluids which present difficult handling problems, such as corrosive acids, sewage and slurries. Because the instrument is free of flow obstructions, it does not tend to plug or foul. The flowmeter can be used to meter liquids without regard to heterogeneous consistency.

An added advantage of an obstructionless construction is that pressure losses are reduced to levels encountered in equivalent lengths of equal diameter pipeline, thereby reducing or conserving pressure source requirements in new or existing hydraulic lines as compared to other metering techniques.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

Typical of commercially-available electromagnetic flowmeters is that unit manufactured by Fischer & Porter Co. of Warminster, Pa., whose Model 10D1430 flowmeter is described in Instruction Bulletin 10D1430A-1-Revision 4. This meter consists of a carbon-steel pipe spool flanged at both ends and serving as a meter body. Saddle-shaped magnetic coils are fitted on opposite sides of the inner surface of the meter body, the magnetically-permeable pipe spool acting as a core or return path for the magnetic field generated by these coils.

The coils in this known form of meter are potted within an epoxy-based compound. An interior liner of neoprene or similar insulating material is inserted within the pipe and turned out against the faces of the mounting flanges. Disposed at diametrically-opposed positions within the central portion of the meter body are two cylindrical electrodes that are insulated from the pipe, the faces of the electrodes being flush with the inner surface of the pipe and coming in contact with the fluid to be metered. Connected to these electrodes and housed in a box external to the pipe are calibration components and a pre-amplifier.

In installing a standard magnetic flowmeter of the above-described type, the meter is interposed between the upstream and downstream pipes of a fluid line, each pipe having an end flanges. The mounting flanges on the meter are bolted to the flanges of line pipes. It is, of course, essential that the circle of bolt holes on the mounting flanges of the meter match those on the pipe flanges.

In a magnetic flowmeter, the flow tube is subjected to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters of the above-described type which are made up of components that must be assembled are generally of substantial size and weight and quite expensive to manufacture.

In order to provide a compact and readily installable electromagnetic flowmeter whose weight and dimensions are substantially smaller than existing types, the above-identified Schmoock cases, to which the present invention is related, disclose a highly compact flowmeter which, despite its reduced volume and weight, is capable of withstanding high fluid pressures, the flowmeter operating efficiently and reliably to accurately measure flow rates.

The flangeless flowmeter disclosed in said Schmook cases is interposable between the flanged ends of upstream and downstream line pipes for metering fluid passing through the line. In one preferred embodiment, the meter is constituted by a ferromagnetic ring within which a pair of electromagnet coils is supported at opposed positions along a diametrical axis normal to the longitudinal axis of the ring, the longitudinal axis passing through the central flow passage of an annular pressure vessel which is formed of high strength insulating material and is molded within the ring to encapsulate the coils as well as a pair of electrodes disposed at diametrically-opposed positions with respect to the passage along a transverse axis at right angles to the coil axis to define a unitary structure. The unit is compressible between the end flanges of the pipes by bridging bolts that pass through the bore holes in the pressure vessel or which lie outside of the ring to encage the unit.

In the various embodiments of the flowmeter disclosed in the cited Schmook cases, in order to encapsulate the components of the meter with a potting compound, an appropriate mold has to be created for the unit and means must be provided to locate and hold within the mold the various subassemblies, magnet parts and other components of the meter. These requirements complicate the manufacturing procedure and add substantially to the cost of production.

Moreover, since the electronic drive circuit for the electromagnets of the meter and the electronic amplifier, filter networks and other circuits for processing the meter signal which together constitute a converter assembly must be housed in some manner in the proximity of the meter structure, means must therefore be provided to mount the converter assembly on or adjacent to the meter. This requirement introduces a further complication in the installation of the flowmeter in a pipeline.

SUMMARY OF INVENTION

In view of the foregoing, the main object of this invention is to provide a highly compact and efficient electromagnetic flowmeter which may be manufactured at low cost and readily installed in a pipeline.

More particularly, it is an object of this invention to provide a flangeless flowmeter of the above type which is interposable between the flanged ends of upstream and downstream pipes in a fluid line for metering fluid passing through the line, the meter being subjected to compression by bolts bridging the pipe flanges to effect a fluid seal, the meter having a central metal spool of high mechanical strength which functions as a flow conduit and also renders the meter capable of withstanding high compressive forces as well as fluid pressure.

Also an object of the invention is to provide an electromagnetic flowmeter in which a non-magnetic metal spool functioning as a flow conduit is surrounded by a ferromagnetic housing which acts as an integral mold for potting the inner chamber defined between the spool and the housing and encapsulating the components contained therein, the housing providing means for locating the various components of the meter and serving as the magnetic flux return path for the electromagnets supported thereby.

A significant feature of the invention is that the housing functions as a weatherproof enclosure for the meter and as a support for an associated converter assembly.

Yet another object of the invention is to provide a meter housing of split construction which greatly simplifies the assembly of the components which make up the meter.

Briefly stated, these objects are attained in a flowmeter unit in accordance with the invention which includes a non-magnetic metal spool of high strength whose inner surface is lined with insulating material to provide a flow conduit for the fluid to be metered, the spool also serving to withstand the compressive forces to which the meter is subjected by bolts bridging the flanged ends of upstream and downstream pipes between which the unit is interposed as well as the fluid pressure. Surrounding the spool and concentric therewith is a cylindrical housing fabricated of ferromagnetic material, the housing being preferably formed by complementary half-pieces which are interconnected and include end plates which join the corresponding ends of the spool to define an inner chamber. Integral with the half-pieces are two magnet cores which extend at diametrically opposed positions along an axis normal to the longitudinal axis of the cylindrical housing, the cores being surrounded by coils to define electromagnets. Mounted on the spool at diametrically opposed positions along a transverse axis at right angles to the core axis are two electrodes. The inner chamber is filled with a potting compound to encapsulate the electromagnets and the electrodes, the housing serving as a mold for this purpose.

OUTLINE OF DRAWINGS

For a better understanding of the invention as well as other objects and further features thereof, reference is made to the following detailed description to be read in conjunction with the accompanying drawings, wherein:

FIG. 1 is a transverse section taken through a preferred embodiment of an electromagnetic flowmeter in accordance with the invention;

FIG. 2 is a longitudinal section taken through the meter structure; and

FIG. 3 is an elevational view of the meter installed in a flow line to measure the rate of flow therethrough.

DESCRIPTION OF INVENTION

Referring now to FIGS. 1 and 2, there is illustrated a flangeless flowmeter unit in accordance with the invention, the unit including a non-magnetic metal spool 10 of high strength, preferably fabricated of stainless steel, having end flanges 10A and 10B. Spool 10, after addition of liner 11, acts as the flow conduit for the meter and has the same or smaller inner diameter as that of the adjacent piping.

It is also provided with external reinforcing ribs 10R; for the spool must be capable of withstanding not only the pressure of the fluid being metered but also the compressive force to which it is subjected. This force is generated by bolts which bridge the flanges of the upstream and downstream pipes between which the unit is interposed.

Spool 10 surrounds a tubular liner 11 of synthetic plastic material having end flanges 11A and 11B which overlie the end flanges of the spool. The liner is preferably injection molded of a material such as KYNAR and includes diametrically-opposed sockets $S_1$ and $S_2$ to accommodate the metal electrodes of the meter. The electrodes lie on an axis X which is perpendicular to the longitudinal flow axis Z.

Surrounding the lined metal spool 10 and concentric therewith is a split cylindrical housing or casing formed by complementary half-pieces $12_u$ and $12_l$, the longitudinal edges of these pieces being provided with respective flanges 13 and 14. These flanges are welded, screwed or otherwise joined together to complete the housing. Housing $12_u$-$12_l$ is fabricated of cast steel or other "soft" ferromagnetic material.

Integral with the housing pieces are two magnet cores 15 and 16 formed of the same cast steel material. The cores are diametrically-opposed and extend along an axis Y normal to longitudinal axis Z, axis Y being at right angles to electrode axis X, so that the axes are mutually perpendicular. The free ends of cores 15 and 16 are snugly received in circular wells formed in spool 10, thereby exactly locating the spool with respect to the housing pieces.

Cores 15 and 16 are surrounded by solenoid coils 17 and 18, respectively. These are shown schematically; but in practice, the coils are pre-formed so that they can be slipped over the cores to form electromagnets. When excited, these electromagnets establish an electromagnetic field whose lines of flux are at right angles to the direction of fluid flow, whereby when the fluid passing through the spool intercepts this field, a voltage is induced therein which is picked up by the electrodes to generate a signal that is a function of flow rate. The leads for the electrodes and for the electromagnets pass out of the unit in the associated converter assembly through bores 19 and 20 in the upper housing piece $12_u$.

The opposite ends of the split housing are provided with annular closure plates 21 and 22 whose inner peripheries mate with the outer peripheries of the end flanges 10A and 10B of the spool to define an inner chamber in the space between the spool and the housing.

Integral with upper housing piece $12_u$ and formed of the same material is an external platform 23 for a converter box 24 (see FIG. 3). This box houses the electronic drive circuit for exciting the electromagnet, circuits for conditioning the signal derived from the electrodes and all other circuits normally associated with an electromagnetic flowmeter primary to provide an output signal suitable for transmission to a remote station for indicating and recording the metered flow rate and for carrying out process control operations.

Since the lined spool 10 is trapped between cores 15 and 16, and since the electrodes of the meter are received within sockets $S_1$ and $S_2$, while coils 17 and 18 are supported on the cores between the housing and the spool, all parts of the meter are properly located and held within the inner chamber when assembling the unit. It then becomes possible to introduce a flowing potting compound of epoxy or other insulating material into the inner chamber through holes 19 and 20 in the housing, and thereby produce, when the compound is cured, a protected, moisture-free unit capable of functioning reliably and efficiently for an indefinite period.

Thus the split housing functions not only as the mechanical support for the converter assembly but it also affords the magnetic flux return path for the electromagnets. Moreover, it provides the means for locating the various subassemblies, spools, leads, magnet parts, etc. Not only does this housing afford a weather proof enclosure for the meter, but it also acts as a mold for potting the inner chamber.

In practice, the unit may be provided with bolt holes $H_1$, $H_2$, $H_3$ and $H_4$ at quadrant positions to receive, as shown in FIG. 3, corresponding bolts $B_1$, $B_2$, etc., which bridge the end flanges of an upstream pipe 25 and a downstream pipe 26 between which the unit is clamped. In practice, sealing gaskets may be provided between the ends of the unit and the flanges.

In order to effect a good fluid seal, the unit is subjected to a high compressive force by the bolt torque. But because of the high strength of the metal spool, the unit is capable of withstanding this force. In a very small unit, it may be preferable to have the bolts which bridge the flanges, surround and encage the unit rather than pass through bores in the unit.

While there has been shown and described a preferred embodiment of an improved unitary electromagnetic flowmeter in accordance with the invention, it will be appreciated that many changes and modifications may be made therein without, however, departing from the essential spirit thereof. Thus instead of having two magnet cores integral with the housing, each core may be split to provide a pair of core sections. And while the drawing shows a housing having end plates which mate with the flanges of the spool, in some meter sizes, particularly large sizes with bolts outside the housing, the design may be such that the cylindrical portion of the housing will be directly joined to the spool flanges to create the inner chamber. Also, instead of a split housing having edge flanges, the flanges may be eliminated in favor of a seam weld.

The electrodes used with the meter may be conventional small diameter wetted electrodes or large surface area wetted electrodes. Alternatively, large area insulated electrodes may be used with or without shields. And while the meter illustrates electromagnets having ferromagnetic cores, in some embodiments of the meter use may be made of a coreless electromagnets.

I claim:

1. An electromagnetic flowmeter unit interposable between the flanged ends of upstream and downstream pipes in a line carrying a fluid whose flow rate is to be measured, the flanged ends being bridged by bolts which subject the unit to a compressive force to effect a fluid seal, said unit comprising:
   A a non-magnetic metal spool to provide a flow conduit, said spool having a strength sufficient to withstand the pressure of the fluid and said compressive force, said spool having end flanges;
   B an insulating liner for said spool;
   C a cylindrical housing formed of ferromagnetic material surrounding said spool and concentric therewith, said housing having integral therewith at least two magnet cores of the same material which are disposed at diametrically-opposed positions along an axis normal to and intersecting the longitudinal flow axis of the spool, said housing mating with the flanges of the spool to create an inner chamber between the spool and the housing;
   D coils surrounding said cores to define a pair of electromagnets; and
   E a pair of electrodes mounted on said spool at diametrically-opposed positions along an axis which is perpendicular both to the flow axis and the core axis.

2. A unit as set forth in claim 1, wherein said liner is injection molded of plastic material and has end flanges which overlie the end flanges of the spool.

3. A unit as set forth in claim 2, wherein said liner is provided with sockets to receive and insulate said electrodes.

4. A flowmeter as set forth in claim 1, wherein said chamber is filled with a potting compound to encapsulate said electrodes and said electromagnets.

5. A flowmeter as set forth in claim 1, wherein said spool is fabricated of stainless steel.

6. A flowmeter as set forth in claim 1, wherein said spool is fabricated of cast stainless steel.

7. A flowmeter as set forth in claim 1, wherein the free ends of said cores are received in wells formed in said spool to focus the flux, minimize the reluctance of the flux path and trap said spool within said housing.

8. A flowmeter as set forth in claim 1, wherein said housing is of split construction and is defined by complementary half pieces.

9. A flowmeter as set forth in claim 8, wherein said half pieces are provided with edge surfaces which are joined together.

10. A flowmeter as set forth in claim 9, wherein one of said half pieces has integral therewith a platform to support a converter assembly.

11. A flowmeter as set forth in claim 1, wherein the unit is provided with longitudinally-extending bores to accommodate said bolts.

12. An electromagnetic flowmeter unit interposable between the flanged ends of upstream and downstream pipes in a line carrying a fluid whose flow rate is to be measured, the flanged ends being bridged by bolts which subject the unit to a compressive force to effect a fluid seal, said unit comprising:
   A a non-magnetic metal spool to provide a flow conduit, said spool having a strength sufficient to withstand the pressure of the fluid and said compressive force, said spool having end flanges;
   B an insulating liner for said spool;
   C a cylindrical housing formed of ferromagnetic material surrounding said spool and concentric therewith, said housing mating with the flanges of the spool to create an inner chamber between the spool and the housing;

D electromagnets disposed within said inner chamber at diametrically-opposed positions along a field axis normal to and intersecting the longitudinal flow axis of the spool, and E a pair of electrodes mounted on said spool at diametrically-opposed positions along an axis which is perpendicular both to the flow axis and the field axis, said chamber being filled with a potting compound to encapsulate said electrodes and said electromagnets.

* * * * *